(12) United States Patent
Lau et al.

(10) Patent No.: US 8,710,707 B2
(45) Date of Patent: Apr. 29, 2014

(54) ELECTRIC MOTOR

(75) Inventors: James Ching Sik Lau, Hong Kong (CN); Xiao Jun Yang, Shenzhen (CN); Kwong Yip Poon, Hong Kong (CN)

(73) Assignee: Johnson Electric S.A., Murten (CH)

( * ) Notice: Subject to any disclaimer, the term of this patent is extended or adjusted under 35 U.S.C. 154(b) by 64 days.

(21) Appl. No.: 13/296,764

(22) Filed: Nov. 15, 2011

(65) Prior Publication Data
US 2012/0119627 A1 May 17, 2012

(30) Foreign Application Priority Data

Nov. 15, 2010 (CN) .......................... 2010 1 0548746

(51) Int. Cl.
*H02K 5/16* (2006.01)
(52) U.S. Cl.
USPC ............................................ 310/90; 310/411
(58) Field of Classification Search
USPC .................. 31/43, 83, 90, 400, 401, 405, 411
See application file for complete search history.

(56) References Cited

U.S. PATENT DOCUMENTS

| | | | | |
|---|---|---|---|---|
| 2,819,417 | A | * | 1/1958 | Glass ...................... 310/216.124 |
| 3,161,794 | A | * | 12/1964 | Lindgren ......................... 310/89 |
| 4,244,099 | A | * | 1/1981 | Haydon .......................... 29/596 |
| 5,500,994 | A | | 3/1996 | Itaya |
| 5,788,210 | A | | 8/1998 | Mimura |
| 6,198,189 | B1 | | 3/2001 | Takahashi et al. |
| 7,456,536 | B2 | | 11/2008 | Tanaka et al. |
| 7,459,817 | B2 | * | 12/2008 | VanLuik et al. ................. 310/89 |
| 7,605,508 | B2 | * | 10/2009 | Baumgartner et al. .......... 310/90 |

* cited by examiner

*Primary Examiner* — Dang Le
(74) *Attorney, Agent, or Firm* — Muncy, Geissler, Olds & Lowe, P.C.

(57) ABSTRACT

An electric motor includes a stator and a rotor rotatably installed in the stator. The stator includes a pair of end caps disposed at opposite ends thereof, and a pair of bearings respectively fixed to outer surfaces of the end caps from outside thereof. The rotor includes a shaft pivotally supported by the bearings.

14 Claims, 3 Drawing Sheets

ELECTRIC MOTOR

CROSS REFERENCE TO RELATED APPLICATIONS

This non-provisional patent application claims priority under 35 U.S.C. §119(a) from Patent Application No. 201010548746.8 filed in The People's Republic of China on Nov. 15, 2010.

FIELD OF THE INVENTION

This invention relates to an electric motor and in particular, to a small electric motor which may be used for electrical appliances, such as power tools.

BACKGROUND OF THE INVENTION

A stator of a traditional electronically commutated motor usually comprises a pair of end caps located at opposite axial ends thereof and four bolts located outside of the stator and fixed to the end caps at four spaced locations thereof. A cooling fan is typically located inside the stator, within one of the end caps.

However, the bolts located outside of the stator occupy extra space, which is contrary to the trend of miniaturization. Furthermore, the size of the fan located inside the stator is limited by the size of the end caps, which limits the cooling capability of the fan.

SUMMARY OF THE INVENTION

Hence there is a desire for a motor in which the end caps are fixed to the stator core without the use of bolts passing from one end cap to the other, through the stator core.

Accordingly, in one aspect thereof, the present invention provides an electric motor comprising: a stator core having first and second ends; first and second end caps fixed with respect to the stator core; first and second bearings respectively fixed to the end caps; and a rotor installed in the stator, the rotor comprising a shaft rotatably supported by the bearings, wherein the bearings are fixed to the end caps from outside of the end caps and the bearings clamp the end caps to the stator core.

Preferably, each end cap defines a stepped hole which comprises a large section near an outer surface of the end cap and a small section near an inner surface of the end cap, the shaft of the rotor extending through the large section and the small section which are coaxial with the shaft, each bearing being received in the large section of the corresponding stepped hole.

Preferably, the stator core comprises a yoke and a plurality of teeth extending inwardly from the yoke, each tooth having a pole shoe which confronts the rotor, the motor further comprising: windings wound about respective teeth of the stator core, and a plurality of locking members engaging the stator core and the end caps to space the end caps from the stator core.

Preferably, the locking members are elongate pins with grooves in opposite sides thereof and extend through gaps between the pole shoes of adjacent teeth, circumferential edges of the pole shoes being received in corresponding grooves of the locking members.

Preferably, the locking members extend from the first end cap to the second end cap, with respective ends of each locking member engaging a corresponding end cap.

Preferably, the locking members have at least one position slot cooperating with an axial end of the pole shoes to position the pins in the axial direction of the motor.

Preferably, some of the locking members are inserted into the stator from the first end of the stator core and the remaining locking members are inserted into the stator from the second end of the stator core.

Preferably, the locking members have locking holes, the end caps have through holes corresponding to the locking holes and fasteners extend through the through holes and engage with the corresponding locking holes.

Alternatively, the locking members have locking holes in the axial ends thereof, the end caps have through holes or locking posts corresponding to the locking holes, and one of the locking holes of each locking member is engaged with a locking post and the other of the locking holes is engaged with a fastener which extends through a corresponding through hole.

Alternatively, the locking members have locking holes in the axial ends thereof, and the end caps have locking posts respectively disposed within the locking holes.

Alternatively, the end caps have a plurality of locating holes and the ends of the locking members are respectively disposed in the locating holes.

Preferably, the rotor further comprises a fan attached to the shaft, the fan being disposed at one end of the stator outside the corresponding end cap.

Preferably, one end of the second bearing extends outwardly beyond an outer surface of the second end cap, and blades of the fan surrounds the end of the second bearing.

Preferably, one end of the first bearing extends outwardly beyond an outer surface of the first end cap.

Preferably, the motor is connected to a gearbox which has a casing, the casing having a through hole through which the shaft of the motor extends, the outer end of the first bearing being fixedly received in the through hole.

According to a second aspect, the present invention provides an electric motor comprising: a stator core; first and second end caps fixed with respect to the stator core; first and second bearings respectively fixed to the end caps; a rotor installed in the stator core, the rotor comprising a shaft rotatably supported by the bearings, and a gearbox having a casing fixed to the outer surface of the first end cap, wherein an end of the first bearing extends outwardly beyond an outer surface of the first end cap and is fixedly received in a through hole of the casing to align the casing with the shaft.

Preferably, each end cap defines a stepped hole which comprises a large section near an outer surface of the end cap and a small section near an inner surface of the end cap, the shaft of the rotor extending through the large section and the small section which are coaxial with the shaft, each bearing being received in the large section of the corresponding stepped hole.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
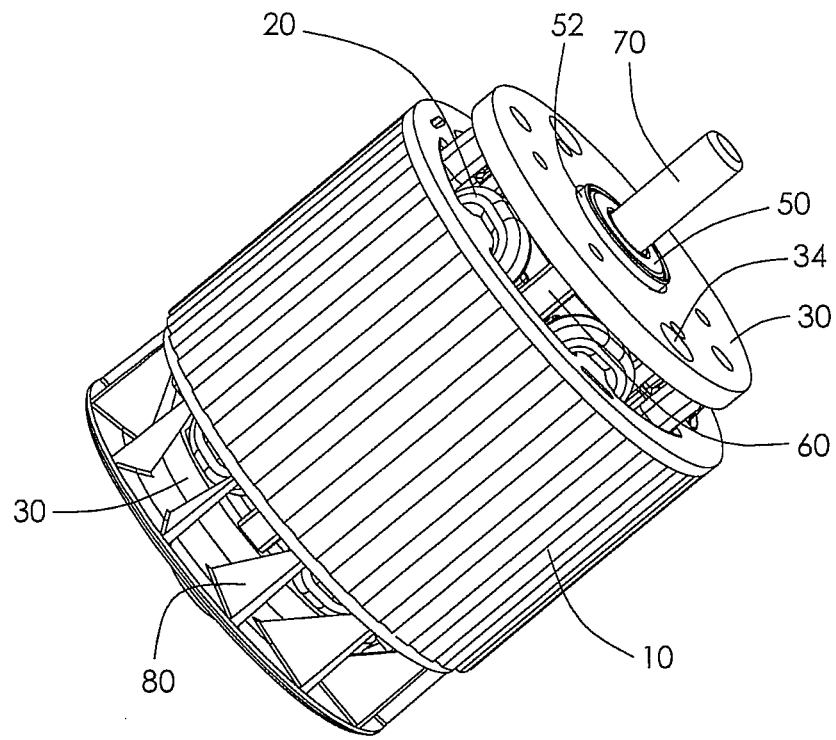
FIG. 1 illustrates an electric motor in accordance with a preferred embodiment of the present invention.

FIGS. 1 to 5 illustrate an electric motor according to a preferred embodiment of the present invention. The motor comprises a stator and a rotor. The stator comprises a stator core 10, windings 20 wound on the stator core 10 and a pair of end caps 30 disposed at opposite axial ends thereof. A pair of bearings 50 is respectively fixed to outer surfaces of the end caps 30 from outside of the end caps 30. The rotor comprises a shaft 70 pivotally supported by the bearings 50.

Figure 2:
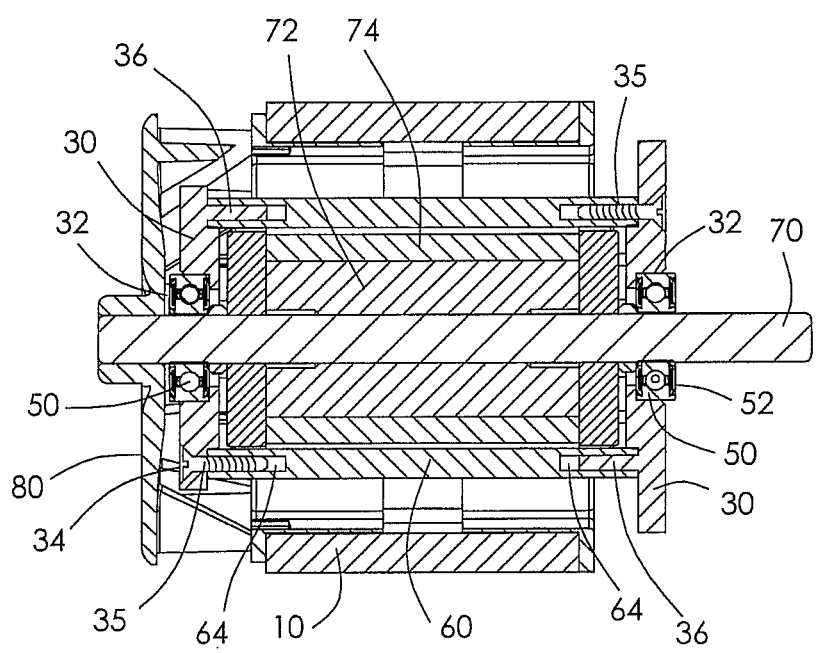
FIG. 2 is a longitudinal sectional view of the motor of FIG. 1.

Referring to FIG. 2, each end cap 30 defines a stepped hole 32 comprising a large section extending inwardly from the outer surface of end cap 30 and a small section extending outwardly from the inner surface of the end cap 30. The large section is coaxial with the small section. A shoulder is formed between the large section and the small section. The bearings 50 are respectively fixedly received in the large sections of the corresponding stepped holes 32 by being pushed inwardly from outside of the end caps 30. Inner ends of the bearings 50 abut against the corresponding shoulder and outer ends 52 of the bearings 50 are exposed outside of the end caps 30.

Figure 3:
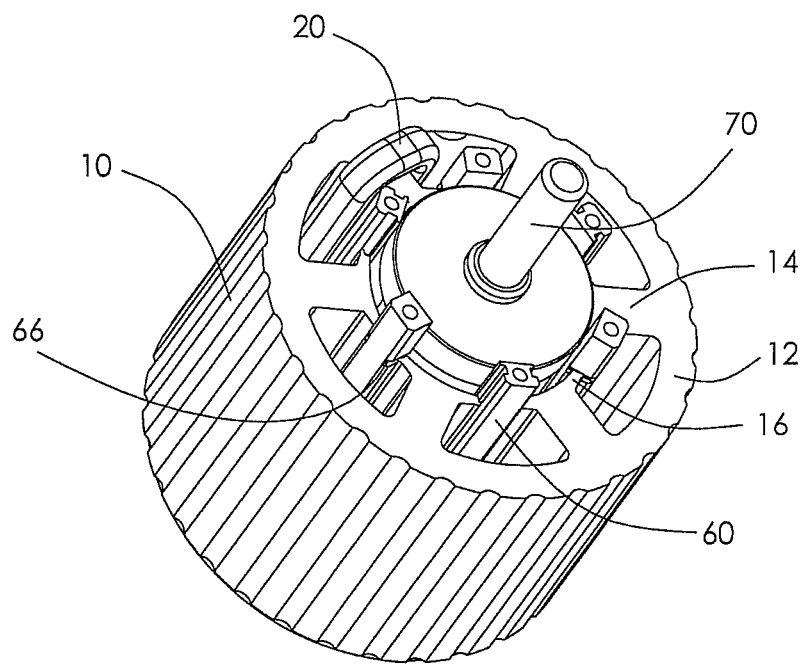
FIG. 3 illustrates the motor with end caps, bearings and fan thereof removed.

Referring to FIG. 3, the stator core 10 is made of magnetic material, for example but not limited to iron. The stator core 10 comprises a yoke 12 and a plurality of teeth 14 extending radially inwardly from the yoke 12. A pole shoe 16 extending along the circumferential direction of the motor is formed at the inner end of each tooth 14. The windings 20 are wound about the teeth 14. In FIG. 3 only one coil is shown.

Figure 4:
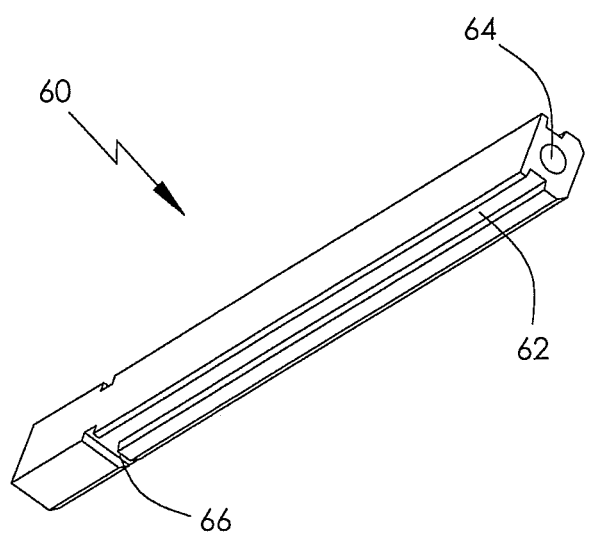
FIG. 4 illustrates a locking member of the motor.

The stator further comprises a plurality of locking members 60, as shown in FIG. 4, configured to secure or fix the end caps 30 to the stator core. The locking members 60 space the end caps 30 from the stator core. Preferably, each of the locking members 60 extends from one end cap 30 to the other end cap 30 through a slot formed between adjacent teeth 14. In this embodiment, the locking members 60 are elongate locking pins. Preferably, the locking members 60 are made of a non-magnetic material, such as plastic or aluminum so as to not interfere with the magnetic path of the motor. Each pin 60 has a pair of guiding grooves 62 in opposite sides thereof for receiving the corresponding pole shoes 16. One end of the guiding grooves 62 extend through one end of the pin 60 and the other end of the guiding grooves 62 are spaced from the other end of the pin 60. A locking hole 64 is defined in each axial end of the pin 60. A pair of transverse position slots 66 is respectively formed between the other end of the pin 60 and the other ends of the guiding grooves 62. The position slots 66 communicate with and are perpendicular to the corresponding guiding grooves 62.

Each end cap 30 may have a plurality of through holes 34 corresponding to the locking holes 64 of the pins 60. In assembly, one end of the pin 60 is inserted into the stator by sliding the guiding grooves 62 along the pole shoes 16 until the axial ends of the pole shoes 16 abut/contact the axial boundary of the transverse position slot 66 near the other end of the pin 60. Fasteners such as screws 35 extend through the through holes 34 of the end caps 30 and engage the locking holes 64 of the pins 60 to thereby fix the end caps 30 with the pins 60.

Alternatively, the end cap 30 may have locking posts 36 integrally formed there with and extending from the inner surface thereof. The locking posts 36 are received in the corresponding locking holes 64 of the pins 60. Preferably, one locking hole 64 of the pin 60 is engaged with a locking post 36 and the other locking hole 64 of the pin 60 is engaged with a fastener which extends through a through hole 34 of the end cap 30. In this embodiment, the stator has six teeth 14 and six locking pins 60 extend through respective slots formed between adjacent teeth 14. Each end cap 30 comprises three through holes 34 to allow fasteners to extend there through to engage in the locking holes 64 of three pins 60 and three locking posts 36 engaged in the locking holes 64 of the other three pins 60. Preferably, the locking pins 60 are alternately inverted, meaning three pins are inserted from one end of the stator core and the remaining three pins are inserted from the other end of the stator core, thus fixing the axial position of the stator core between the end caps.

Figure 7:
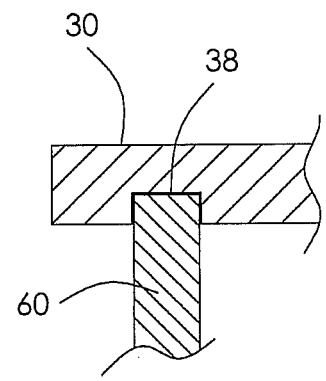
FIG. 7 illustrates a modified connection between a locking member and an end cap.

Alternatively, the end caps 30 may be fixed to the locking pins by locking projections only, with the bearings providing the clamping force clamping the end caps to the locking pins. In this arrangement no fasteners are used to fix the locking pins to the end caps. Optionally, the locking projections may be replaced by locating holes 38 formed in the end caps to receive ends of the locking pins 60 as shown in FIG. 7. The locating holes 38 may be through holes requiring shoulders to be formed on the locking members or blind holes or recesses, in which case the ends of the locking members may bear directly against the end cap.

The rotor further comprises a rotor core 72 fixed on the shaft 70 and permanent magnets 74 fixed on the rotor core 72. The magnets 74 face the windings 20. The shaft 70 extends through the stepped holes 32 of the end caps 30. A fan 80 is mounted to one end of the shaft 70 and located outside of the end cap 30. Preferably, the fan 80 is a centrifugal blower, also known as a radial fan. When rotating, the fan 80 generates airflow passing through the inside of the stator to cool the stator core 10 and windings 20. Alternatively, the fan 80 may be an axial fan with an outer diameter greater than that of the stator core 10 such that one part of the airflow generated by the fan 80 may pass through the inside of the stator and another part of the airflow may flow over the outer surface of the stator core 10.

Optionally, the bearing adjacent the fan may be arranged such that the outer end of the bearing is exposed and the blades of the fan arranged to radially surround the exposed end of the bearing to aid cooling of the bearing. This is particularly beneficial when the end cap is made of plastic.

Figure 5:
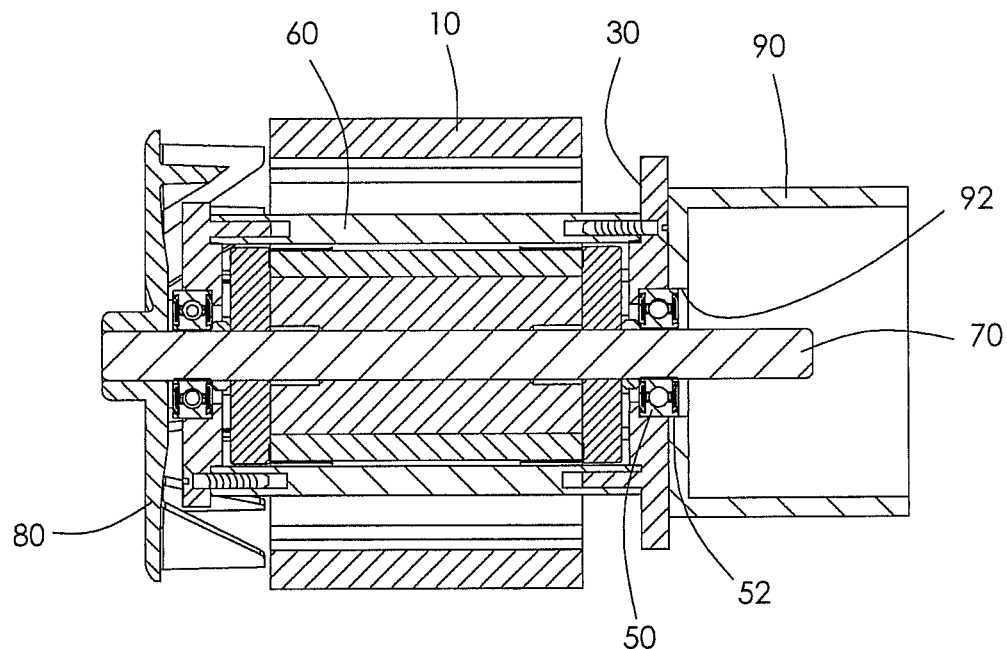
FIG. 5 is a longitudinal sectional view of the motor assembled with a casing of a gearbox.
Figure 6:
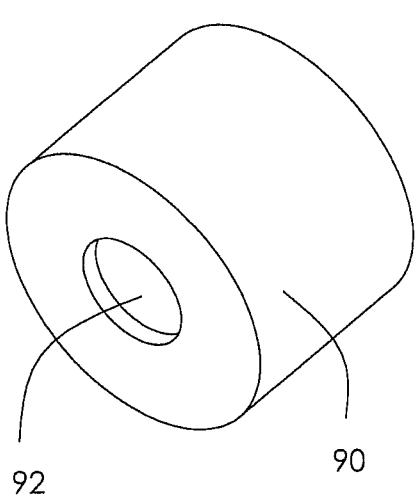
FIG. 6 illustrates the casing of the gearbox of FIG. 5.

Referring also to FIGS. 5 & 6, the size of the bearing 50 in the axial direction is greater than that of the large section of the stepped hole 32 such that the outer end 52 of the bearing 50 extends beyond the outer surface of the end cap 30 and is exposed to the outside of the end cap 30. When the motor is connected to a gearbox which has a casing 90 to house gears etc. therein, the exposed outer end 52 of the bearing 50 may be fixedly received in a through hole 92 of the casing 90 to thereby align the casing 90 of the gearbox with the shaft 70 of the motor.

By the use of the two bearings being mounted from outside of the end caps, the end caps can be clamped, directly or indirectly such as by the use of the locking members, to the core of the stator. The use of the outside mounted bearings removes a lot of the stress on the connection between the end caps and the stator core or housing by changing the direction of any axial forces applied to the shaft or rotor such that the axial forces on the shaft, press one of the end caps against the stator core through the bearing connection. Thus the axial forces applied to the shaft place the connections between the end caps and the stator core under compression instead of tension. Thus the connection is able to withstand much higher axial forces before failure.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. An electric motor comprising:
  a stator core having first and second ends;
  first and second end caps fixed with respect to the stator core, each end cap defining a stepped hole having a large section near an outer surface of the end cap and a small section near an inner surface of the end cap;
  first and second ball bearings respectively fixed to the end caps; and
  a rotor installed in the stator, the rotor comprising a shaft rotatably supported by the first and second ball bearings,
  wherein the first and second ball bearings are fixed to the large sections of corresponding stepped holes from outside of the end caps and cooperate with the shaft to axially clamp the end caps with respect to the stator core,
  wherein the motor is connected to a gearbox which has a casing, the casing having a through hole through which the shaft extends, and
  wherein the first ball bearing has one end being fixedly received in the large section of the stepped hole of the first end cap and an other end extending outwardly beyond an outer surface of the first end cap to be fixedly received in the through hole of the casing of the gearbox, to thereby axially align the first end cap and the casing with the shaft.

2. The motor of claim 1, wherein the stator core comprises a yoke and a plurality of teeth extending inwardly from the yoke, each tooth having a pole shoe which confronts the rotor, the motor further comprising: windings wound about respective teeth of the stator core; and
  a plurality of locking members engaging the stator core and the end caps to space the end caps from the stator core.

3. The motor of claim 1, wherein the rotor further comprises a fan attached to the shaft, the fan being disposed at one end of the stator outside the corresponding end cap.

4. The motor of claim 3, wherein one end of the second bearing extends outwardly beyond an outer surface of the second end cap, and blades of the fan surrounds said end of the second bearing.

5. An electric motor comprising:
  a stator core having first and second ends;
  first and second end caps fixed with respect to the stator core;
  first and second bearings respectively fixed to the end caps; and
  a rotor installed in the stator, the rotor comprising a shaft rotatably supported by the bearings,
  wherein the bearings are fixed to the end caps from outside of the end caps and the bearings clamp the end caps to the stator core,
  wherein each end cap defines a stepped hole which comprises a large section near an outer surface of the end cap and a small section near an inner surface of the end cap, the shaft of the rotor extending through the large section and the small section which are coaxial with the shaft, each bearing being received in the large section of the corresponding stepped hole,
  wherein the stator core comprises a yoke and a plurality of teeth extending inwardly from the yoke, each tooth has a pole shoe which confronts the rotor, the motor further comprises windings wound about repective teeth of the stator core and a plurality of locking members engaging the stator core and the end caps to space the end caps from the stator core, and
  wherein the locking members are elongate pins with grooves in opposite sides thereof and extend through gaps between the pole shoes of adjacent teeth, circumferential edges of the pole shoes being received in corresponding grooves of the locking members.

6. The motor of claim 5, wherein the locking members extend from the first end cap to the second end cap, with respective ends of each locking member engaging a corresponding end cap.

7. The motor of claim 6, wherein the locking members have at least one position slot cooperating with an axial end of the pole shoes to position the pins in the axial direction of the motor.

8. The motor of claim 7, wherein some of the locking members are inserted into the stator from the first end of the stator core and the remaining locking members are inserted into the stator from the second end of the stator core.

9. The motor of claim 6, wherein the locking members have locking holes, the end caps have through holes corresponding to the locking holes and fasteners extend through the through holes and engage with the corresponding locking holes.

10. The motor of claim 6, wherein the locking members have locking holes in the axial ends thereof, the end caps have through holes or locking posts corresponding to the locking holes, and one of the locking holes of each locking member is engaged with a locking post and the other of the locking holes is engaged with a fastener which extends through a corresponding through hole.

11. The motor of claim 5, wherein the locking members have locking holes in the axial ends thereof, and the end caps have locking posts respectively disposed within the locking holes.

12. The motor of claim 5, wherein the end caps have a plurality of locating holes and the ends of the locking members are respectively disposed in the locating holes.

13. An electric motor comprising:
  a stator core;
  first and second end caps fixed with respect to the stator core, each of the first and second end caps defining a hole;
  first and second ball bearings respectively received in the holes of the end caps;
  a rotor installed in the stator, the rotor comprising a shaft rotatably supported by the bearings, and
  a gearbox having a casing fixed to the outer surface of the first end cap,
  wherein an end of the first bearing extends outwardly beyond an outer surface of the first end cap and is fixedly received in a through hole of the casing to align the casing with the shaft, the first bearing having an opposite end received in the hole of the first end cap to align the first end cap with the shaft.

14. The motor of claim 13, wherein the hole is a stepped hole which comprises a large section near an outer surface of the end cap and a small section near an inner surface of the end cap, the shaft of the rotor extending through the large section and the small section which are coaxial with the shaft, each bearing being received in the large section of the corresponding stepped hole.

* * * * *